(12) United States Patent
Fujishiro et al.

(10) Patent No.: US 7,080,251 B2
(45) Date of Patent: Jul. 18, 2006

(54) CERTIFICATE VALIDITY AUTHENTICATION METHOD AND APPARATUS

(75) Inventors: Takahiro Fujishiro, Yokohama (JP); Satoru Tezuka, Yokohama (JP); Yoko Kumagai, Kawasaki (JP); Tomoharu Morio, Sakura (JP); Yutaka Miyazaki, Sakura (JP)

(73) Assignee: Hitachi, Ltd., Tokyo (JP)

( * ) Notice: Subject to any disclaimer, the term of this patent is extended or adjusted under 35 U.S.C. 154(b) by 881 days.

(21) Appl. No.: 09/941,771

(22) Filed: Aug. 30, 2001

(65) Prior Publication Data

US 2002/0046340 A1 Apr. 18, 2002

(30) Foreign Application Priority Data

Aug. 30, 2000 (JP) ............................. 2000-261065

(51) Int. Cl.
*G06F 17/00* (2006.01)
(52) U.S. Cl. ........................ 713/171; 713/168; 713/150
(58) Field of Classification Search ................ 713/171, 713/168, 150
See application file for complete search history.

(56) References Cited

U.S. PATENT DOCUMENTS 5,745,574 A 4/1998 Muftic (Continued)

FOREIGN PATENT DOCUMENTS

| JP | 11289329 | 10/1999 |
|----|----------|---------|
| JP | 11328117 | 11/1999 |

OTHER PUBLICATIONS

Bridge certification authorities: connecting B2B public key infrastructure with PAK and zero-knowledge proof; Torrellas, G.A.S.; Dominguez. A.T.; Information Assurance Workshop, 2003. IEEE Systems, Man and Cybernetics Society Jun. 18-20, 2003 pp.: 182-187.*

(Continued)

*Primary Examiner*—David Jung
(74) *Attorney, Agent, or Firm*—Mattingly, Stanger, Malur & Brundidge, P.C.

(57) ABSTRACT

A time period which is expended since a request for the authentication of the validity of a public key certificate till the authentication of the validity, is shortened. A certificate validity authentication center VC periodically searches for and verifies paths which extend from a bridge certification authority $CA_{bridge}$ to individual terminal admitting certification authorities CA, and it registers the paths whose verifications have held good, in a path database in association with the respective terminal admitting certification authorities CA. Besides, in a case where the request for the authentication of the validity of a certificate has been made by an end entity EE, whether or not a path associated with the terminal admitting certification authority CA which admits the end entity, and a path associated with the terminal admitting certification authority CA which has issued the certificate being a subject for the request are registered in the path database is checked, and the subject certificate is judged valid only when both the paths are registered.

13 Claims, 12 Drawing Sheets

U.S. PATENT DOCUMENTS 5,867,578 A 2/1999 Brickell et al.
5,996,077 A 11/1999 Williams
6,134,550 A 10/2000 Van Oorschot et al.

OTHER PUBLICATIONS

A new on-line certificate validation method using LDAP component matching technology; Jong Hyuk Choi; Sang Seok Lim; Zeilenga, K.D.; Systems, Man and Cybernetics (SMC) Information Assurance Workshop, 2005. Proceedings from the Sixth Annual IEEE; Jun. 15-17, 2005 pp.: 280-285.*

Security aspects in standard certificate revocation mechanisms: a case study for OCSP; Berbecaru, D.; Lioy, A.; Marian, M.; Computers and Communications, 2002. Proceedings. ISCC 2002. Seventh International Symposium on Jul. 1-4, 2002 pp.: 484-489.*

B. Schneier, "Applied Cryptograph" Applied Cryptograph, Protocols, Algorithms, and Source Code in C, New York, John Wiley & Sons, US, pp. 574-577.

* cited by examiner

PKI SYSTEM

→ : FLOW OF PUBLIC KEY CERTIFICATE
CA : CERTIFICATION AUTHORITY
EE : END ENTITY
VC : CERTIFICATE VALIDITY AUTHENTICATION CENTER
SD : SECURITY DOMAIN

END ENTITY

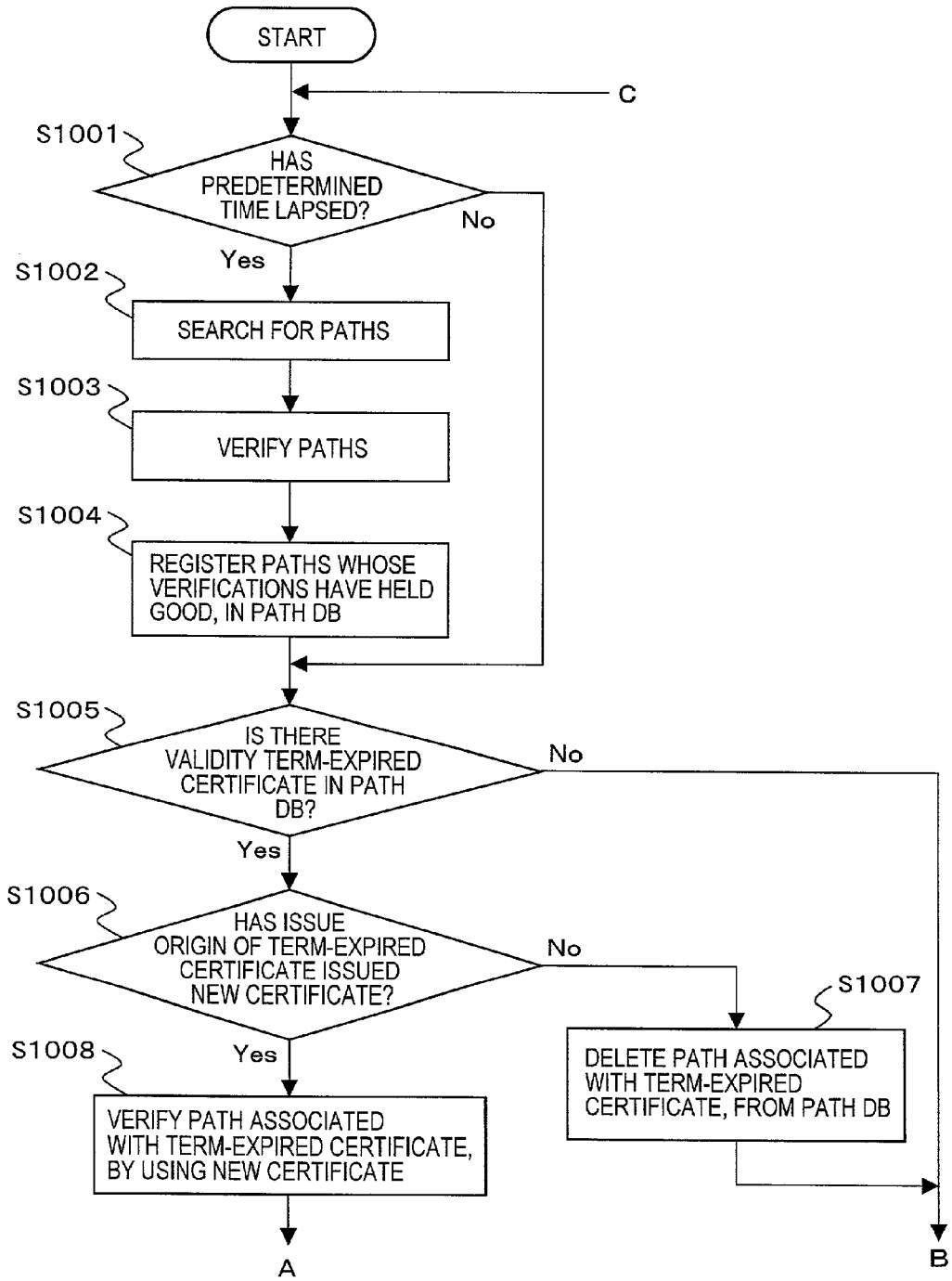

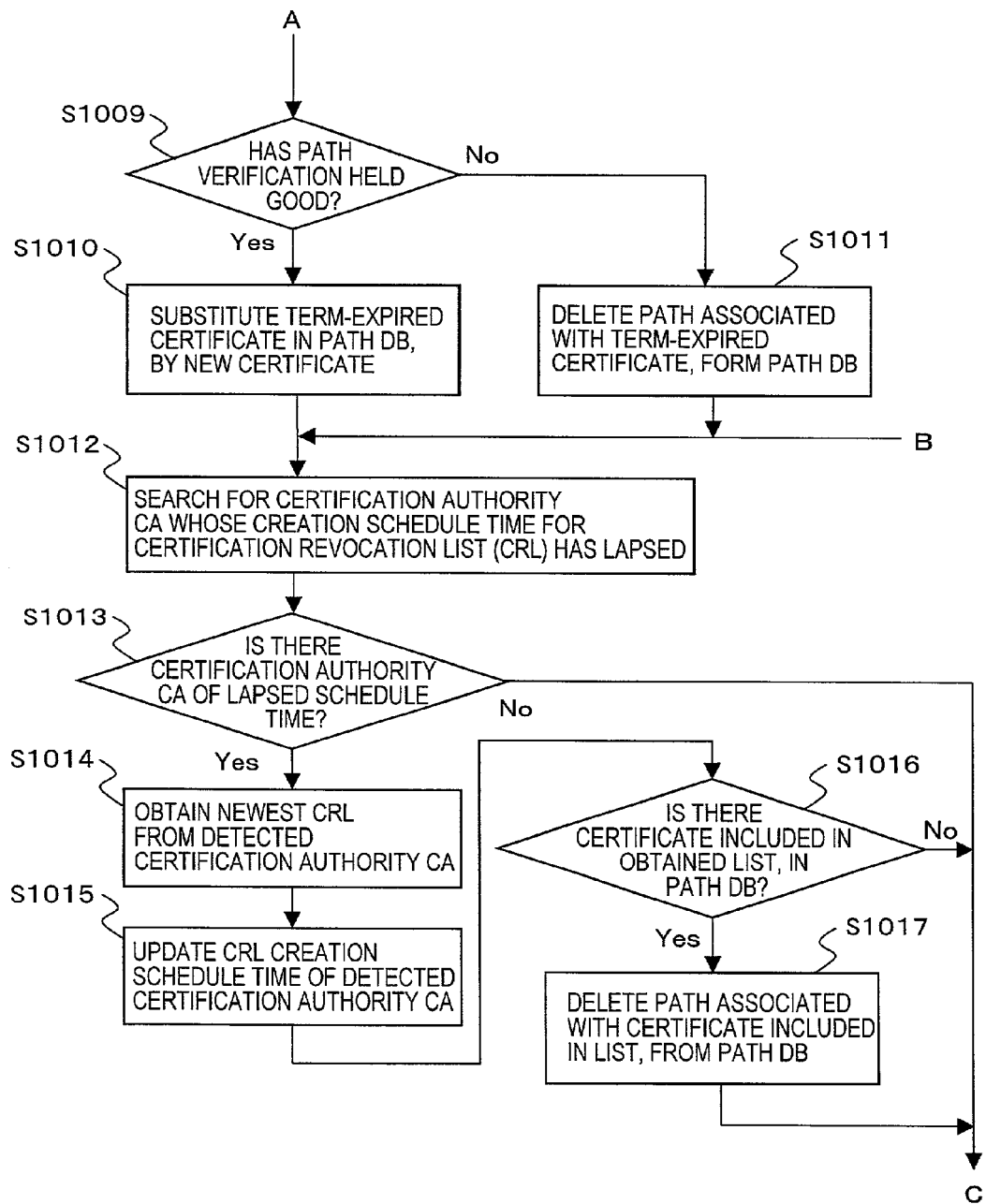

FIG.9

PATH SEARCH RESULT (IN CASE OF FIG. 2)

| TERMINAL ADMITTING CERTIFICATION AUTHORITY | PATH |
|---|---|
| $CA_{12}$ | $CA_{bride}$-$CA_{11}$-$CA_{12}$ |
| $CA_{13}$ | $CA_{bride}$-$CA_{11}$-$CA_{13}$ |
| $CA_{24}$ | $CA_{bride}$-$CA_{21}$-$CA_{22}$-$CA_{24}$ |
| | $CA_{bride}$-$CA_{31}$-$CA_{21}$-$CA_{22}$-$CA_{24}$ |
| $CA_{25}$ | $CA_{bride}$-$CA_{21}$-$CA_{22}$-$CA_{25}$ |
| | $CA_{bride}$-$CA_{21}$-$CA_{23}$-$CA_{26}$-$CA_{25}$ |
| | $CA_{bride}$-$CA_{31}$-$CA_{21}$-$CA_{22}$-$CA_{25}$ |
| | $CA_{bride}$-$CA_{31}$-$CA_{21}$-$CA_{23}$-$CA_{26}$-$CA_{25}$ |
| $CA_{26}$ | $CA_{bride}$-$CA_{21}$-$CA_{23}$-$CA_{26}$ |
| | $CA_{bride}$-$CA_{21}$-$CA_{22}$-$CA_{25}$-$CA_{26}$ |
| | $CA_{bride}$-$CA_{31}$-$CA_{21}$-$CA_{23}$-$CA_{26}$ |
| | $CA_{bride}$-$CA_{31}$-$CA_{21}$-$CA_{22}$-$CA_{25}$-$CA_{26}$ |
| $CA_{32}$ | $CA_{bride}$-$CA_{31}$-$CA_{32}$ |
| | $CA_{bride}$-$CA_{21}$-$CA_{31}$-$CA_{32}$ |

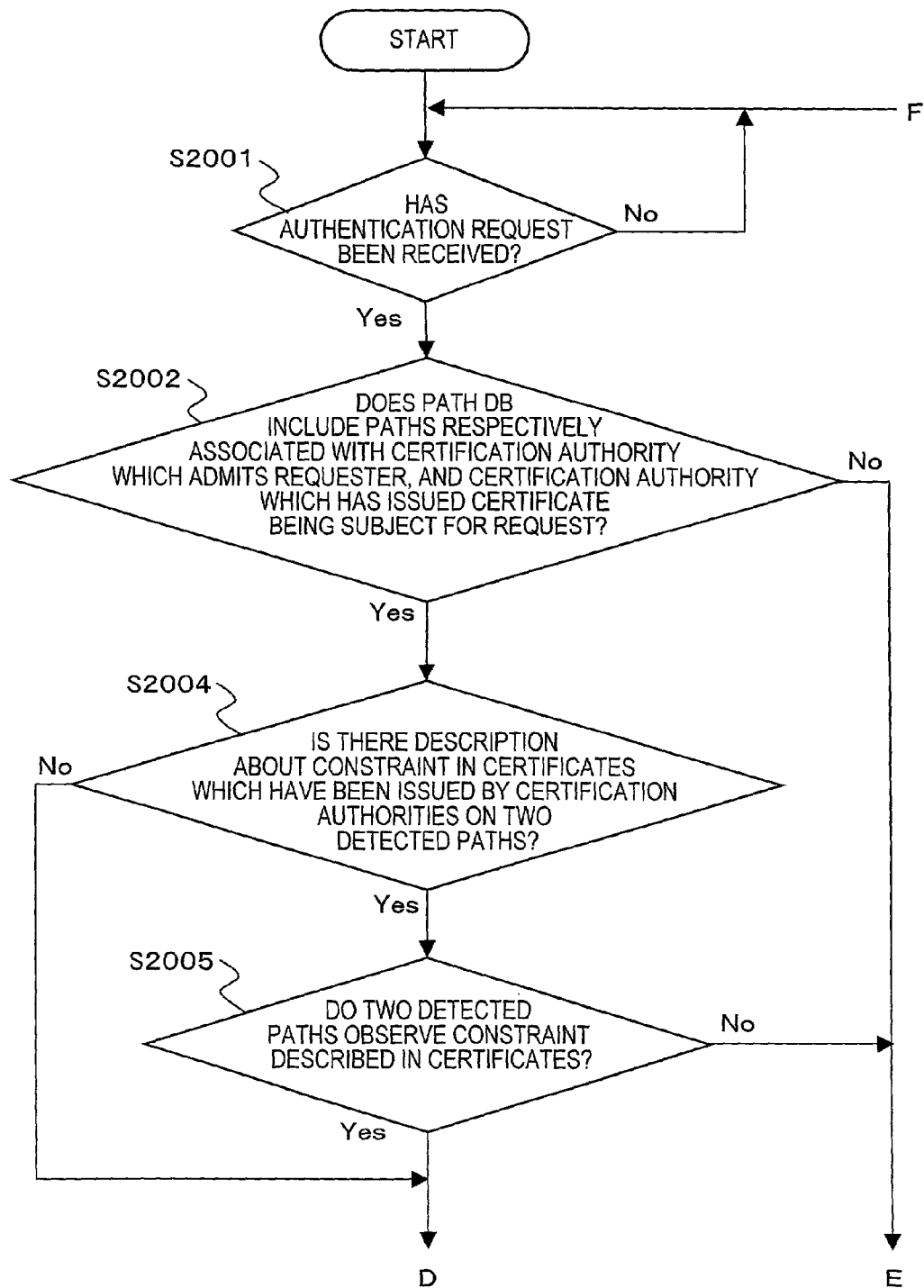

OPERATION OF AUTHENTICATING VALIDITY OF PUBLIC KEY CERTIFICATE

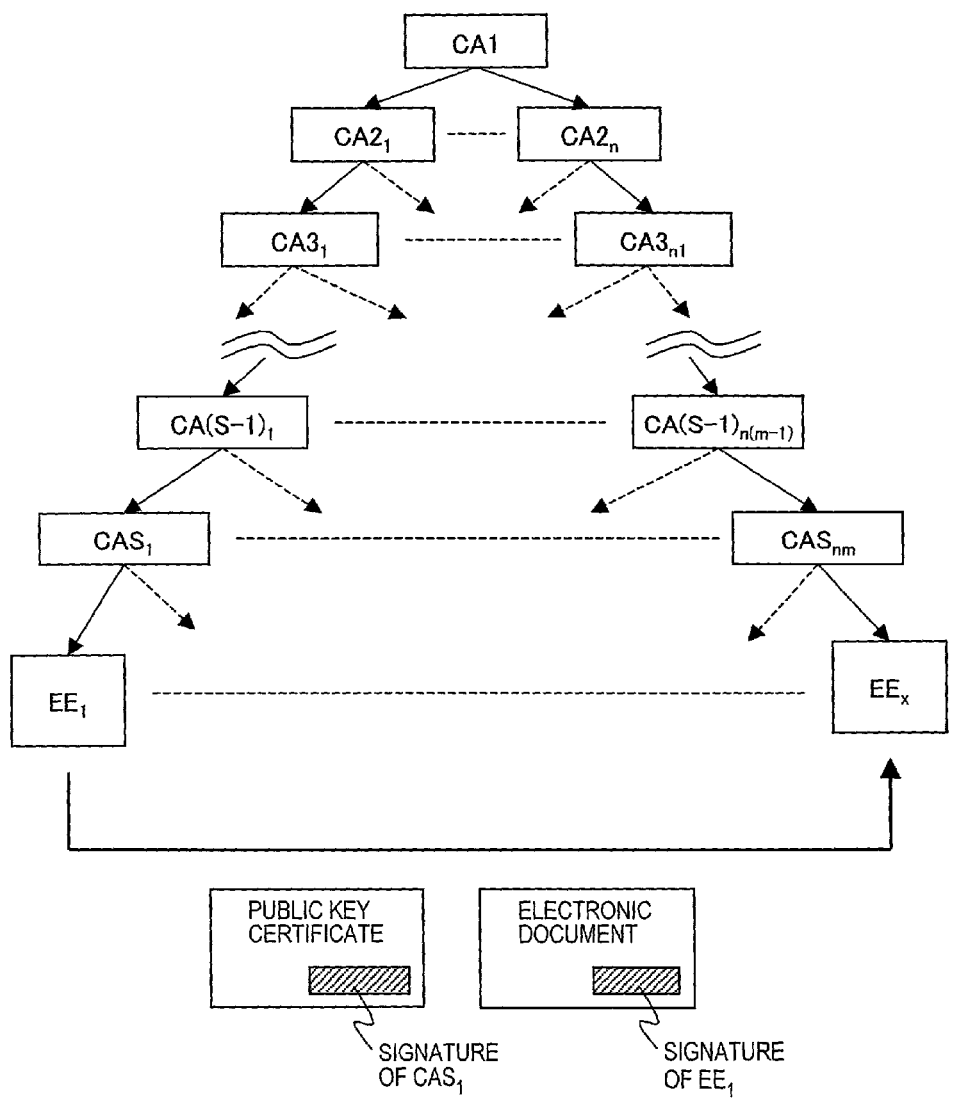

CERTIFICATE VALIDITY AUTHENTICATION METHOD AND APPARATUS

BACKGROUND OF THE INVENTION

The present invention relates to techniques in a PKI (Public Key Infrastructure), well suited for authenticating the validity of a public key certificate which serves to verify a signature for an electronic procedure received by a certain terminal and which has been issued by a certification authority different from one trusted by the pertinent terminal.

In various organizations and parties on private and public bases, PKIs (Public Key Infrastructures) have been introduced and made ready for use in order to electronicize manifold procedures which were taken with sheets of paper in the past.

FIG. 12 shows the relationship among a plurality of certification authorities which exist in a prior-art PKI.

As shown in the figure, the certification authorities each issuing and managing public key certificates form a group having a tree structure whose apex is the root certification authority CA1. The group is called "security domain". The root certification authority CA1 issues public key certificates to the certification authorities $CA2_1$–$CA2_n$ which are located directly downstream of itself. Besides, each of the certification authorities $CA2_1$–$CA2_n$ issues public key certificates to the certification authorities $CA3_1$–$CA3_{n1}$ which are located directly downstream of itself. In this manner, each certification authority located directly upstream in the tree issues public key certificates to the certification authorities located directly downstream of itself. Further, each of the certification authorities located at the downmost stream in the tree (hereinbelow, called "terminal admitting certification authorities") $CAS_1$–$CAS_{nm}$ issues public key certificates to user terminals taking electronic procedures (hereinbelow, called "end entities") $EE_1$–$EE_x$.

The legality of a secret key (signature key) which each of the end entities $EE_1$–$EE_x$ uses for the signature of an electronic document is certified by the public key certificate issued by that one of the terminal admitting certification authorities $CAS_1$–$CAS_{nm}$ which admits the pertinent end entity itself. In turn, the legality of a secret key which each of the terminal admitting certification authorities $CAS_1$–$CAS_{nm}$ uses for the signature of the issued public key certificate is certified by the public key certificate issued by that one of the certification authorities $CA(S-1)_1$–$CA(S-1)_{n(m-1)}$ which admits the pertinent terminal admitting certification authority itself. Accordingly, the secret key which is used for the signature by each of the end entities $EE_1$–$EE_x$ is finally certified by the public key certificate issued by the root certification authority CA1. The certification authority which finally certifies the legalities of the keys respectively used for the signatures by the end entities $EE_1$–$EE_x$, in other words, which is trusted by the end entities $EE_1$–$EE_x$ and which is located at the upmost stream in the tree, is called "trust anchor".

Referring to FIG. 12, the end entity $EE_1$ affixes a signature to an electronic document, such as a written application, to be transmitted to the end entity $EE_x$, by using the secret key of the end entity $EE_1$ itself. Besides, the end entity $EE_1$ attaches to the signed electronic document a public key certificate which pairs with the above secret key and which has been issued by the terminal admitting certification authority $CAS_1$ for admitting this end entity $EE_1$, and it transmits the document and the certificate to the end entity $EE_x$.

The end entity $EE_x$ can verify the signature of the electronic document received from the end entity $EE_1$, by employing the public key certificate attached to this electronic document. Since, however, the public key certificate is not one issued by the terminal admitting certification authority $CAS_{nm}$ for admitting the end entity $EE_x$, this end entity $EE_x$ cannot immediately trust the pertinent public key certificate. In this case, the end entity $EE_x$ must authenticate that the validity of the pertinent public key certificate is certified by the root certification authority CA1 which is the trust anchor of end entity $EE_x$ itself. A validity authentication process for the public key certificate is executed by the following steps:

(1) Search for Path from Trust Anchor to Certification Authority which is Issue Origin of Public key Certificate With a trust anchor (here, the root certification authority CA1) set as a start certification authority, the processing of inspecting the issue destinations of public key certificates issued by the start certification authority and further inspecting if any downstream certification authorities are included among the inspected issue destinations, the issue destinations of public key certificates issued by the downstream certification authorities is continued until a certification authority being the issue origin of a pertinent public key certificate (here, the terminal admitting certification authority $CAS_1$ for admitting the end entity $EE_1$) is included among the further inspected issue destinations. Thus, a path from the trust anchor to the certification authority being the issue origin of the pertinent public key certificate is searched for.

(2) Verification of Detected Path

There are obtained public key certificates issued from the individual certification authorities located on the path detected by the step (1), to the certification authorities located directly downstream of the respective certification authorities on the path. Besides, the processing of verifying the signature of the pertinent public key certificate to be authenticated on its validity (here, the public key certificate issued to the end entity $EE_1$ by the terminal admitting certification authority $CAS_1$), in the light of the public key certificate issued by the certification authority (here, the certification authority $CA(S-1)_1$) located directly upstream of the certification authority (here, the terminal admitting certification authority $CAS_1$) having issued the pertinent public key certificate, and subsequently verifying if the verification holds good, the signature of the public key certificate issued by the certification authority located directly upstream, in the light of the public key certificate issued by the certification authority located directly upstream still further, is continued until the upstream certification authority reaches the trust anchor. In a case where such signature verification has held good up to the trust anchor in due course, the validity of the public key certificate to be authenticated on its validity shall have been authenticated.

The end entity $EE_x$ can authenticate the legality of the electronic document received from the end entity $EE_1$, in such a way that the signature of the electronic document is verified using the public key certificate attached to the electronic document, and that the validity of the public key certificate used for verifying the signature of the electronic document is authenticated in accordance with the steps (1) and (2) stated above.

Incidentally, it is premised in the foregoing that the process for authenticating the validity of the public key certificate is executed in the end entity. However, the certificate validity authentication process is heavy in load, and a high processing capability is required of the end entity for the execution of the process. It has therefore been proposed by the IETF that a server for authenticating the validity of a certificate as is connected to the end entity through a network is disposed so as to authenticate the validity of the public key certificate instead of the end entity.

SUMMARY OF THE INVENTION

A certificate validity authenticating server hitherto proposed authenticates the validity of a public key certificate by executing the steps (1) and (2) stated before, each time it accepts a request from an end entity. Therefore, a time period for executing the steps (1) and (2) is, at least, expended since the request of the end entity for the authentication of the validity of the public key certificate till the obtainment of the result of the authentication.

Besides, although the example of FIG. 12 is premised on only one security domain, a plurality of security domains are conjectured to coexist for the reason that PKIs have been introduced and made ready for use in various organizations and parties on private and public bases as explained before. Even among the different security domains, the process for authenticating the validity of a public key certificate as indicated by the steps (1) and (2) can be realized by performing cross-certification in such a way that the root certification authorities of the individual security domains issue the public key certificates of the security domains opposite to each other, or by disposing a bridge certification authority which performs such cross-certification between it and each of the root certification authorities of the individual security domains. However, when the process for authenticating the validity of a public key certificate is executed among the plurality of security domains in this manner, the number of certification authorities increases, and the relationship among the certification authorities becomes more complicated unlike the simple tree structure as shown in FIG. 12, so that a load for executing the steps (1) and (2) stated before increases. Therefore, the time period which is expended since the request of the end entity for the authentication of the validity of the public key certificate till the obtainment of the result of the authentication is further lengthened to incur degradation in service.

The present invention has been made in view of the above circumstances, and has for its object to shorten a time period which is expended since a request for the authentication of the validity of a public key certificate till the authentication of the validity.

In order to accomplish the object, according to the present invention, in a certificate validity authenticating server which is connected to pluralities of terminals (end entities) and certification authorities through a network, processing stated below is executed in compliance with a request made by a certain terminal, in order to authenticate the validity of a public key certificate issued by a certification authority which is different from a certification authority trusted by the terminal.

Irrespective of the request of any terminal for authenticating the validity of a public key certificate, for example, periodically, there are performed:

the path search step of executing a process in which, with any certification authority set as a start certification authority, an issue destination of a public key certificate issued by the start certification authority is checked, and subject to any certification authority included as the issue destination, an issue destination of a public key certificate issued by the issue-destination certification authority is further checked, the process being continued until all of the issue destinations of the public key certificates become terminals, thereby to search for paths which extend from said start certification authority to terminal admitting certification authorities having issued public key certificates to any terminals;

the path verification step of executing for each of the paths detected by said path search step, a process in which, with said start certification authority set at an upstream side, a signature of the public key certificate issued by the terminal admitting certification authority on the pertinent path is verified in the light of the public key certificate issued by the certification authority located directly upstream, and subject to the verification having held good, a signature of the public key certificate issued by the terminal admitting certification authority located directly upstream is verified in the light of the public key certificate issued by the certification authority located directly upstream still further, the process being continued until said certification authority located directly upstream becomes said start certification authority, thereby to verify said paths; and the path registration step of registering in a database those of said paths whose verifications have held good by said path verification step.

Besides, in a case where the certain terminal has made the request for authenticating the validity of the public key certificate issued by the terminal admitting certification authority which is different from the certification authority trusted by said terminal, said validity of said public key certificate is authenticated by checking whether or not the path between said certification authority trusted by said terminal and said start certification authority and the path between the different terminal admitting certification authority and said start certification authority are held registered in the database.

According to the present invention, when the request for authenticating the validity of the public key certificate has been received from the certain terminal, the reception need not be followed by the search for the path from the trust anchor of the pertinent terminal to the issue-origin certification authority of the subject public key certificate and the verification of the detected path as have been mentioned as the items (1) and (2) before. It is accordingly possible to shorten a time period which is expended since the request for the authentication of the validity of the public key certificate till the authentication of the validity.

BRIEF DESCRIPTION OF THE DRAWINGS

FIG. 7 is a flow chart for explaining the operation of searching for, verifying and managing paths as is executed in the certificate validity authentication center VC shown in FIG. 5;

FIG. 8 is a flow chart for explaining the operation of searching for, verifying and managing the paths as is executed in the certificate validity authentication center VC shown in FIG. 5;

FIG. 9 is a diagram showing paths which extend from a bridge certification authorities $CA_{bridge}$ to respective terminal admitting certification authorities CA, and which are detected by the path search unit 32 of the certificate validity authentication center VC in a case where the certification authorities CA in the relationship shown in FIG. 2;

FIG. 10 is a flow chart for explaining the operation of authenticating the validity of a public key certificate as is executed in the certificate validity authentication center VC shown in FIG. 5;

FIG. 12 is a diagram showing an example of the relationship among a plurality of certification authorities which exist in a prior-art PKI.

DETAILED DESCRIPTION OF THE PREFERRED EMBODIMENTS

Now, embodiments of the present invention will be described.

Figure 1:
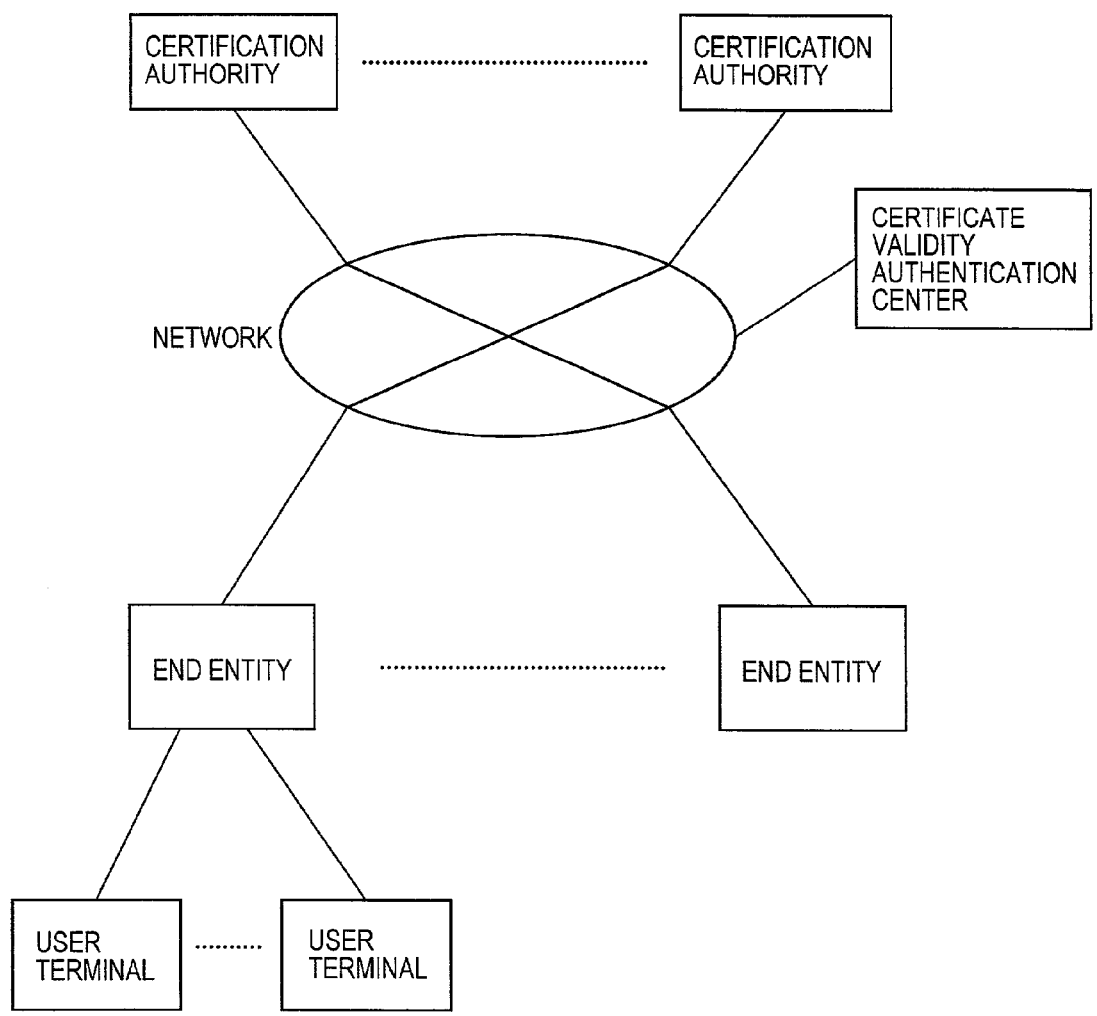
FIG. 1 is a diagram showing the schematic architecture of a PKI system to which an embodiment of the present invention is applied.

FIG. 1 is a diagram showing the schematic architecture of a PKI system to which an embodiment of the present invention is applied.

As shown in the figure, the PKI system of this embodiment is so constructed that a plurality of end entities EE which are user terminals for taking electronic procedures, or request accepting servers for accepting requests from user terminals so as to take electronic procedures for the user terminals, a plurality of certification authorities CA for issuing and managing public key certificates, and a certificate validity authentication center VC for authenticating the validity of a public key certificate in compliance with a request made by the end entity EE, are interconnected through a network NET formed of, for example, LANs, WANs and the Internet connecting them.

Figure 2:
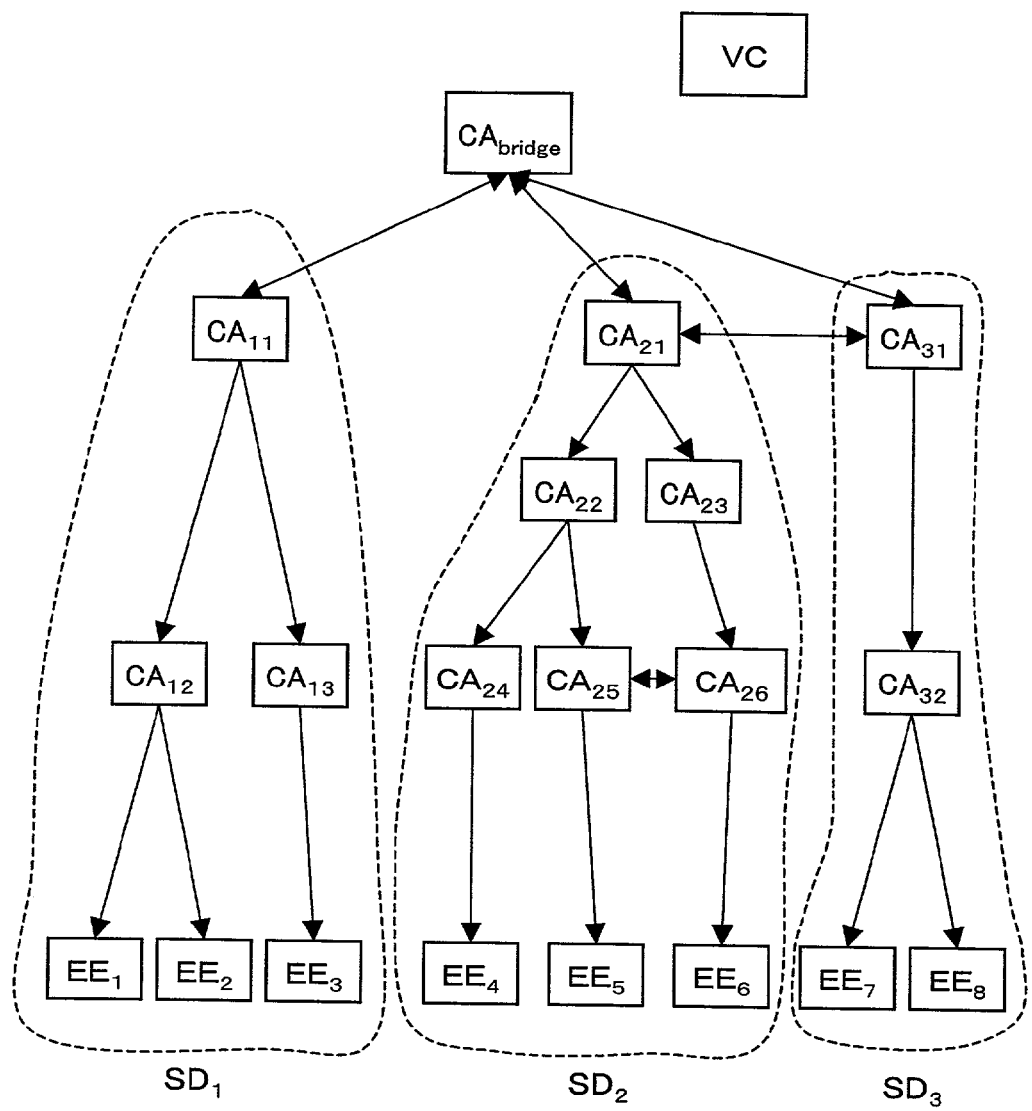
FIG. 2 is a diagram showing an example of the relationship among individual certification authorities CA in the PKI system shown in FIG. 1.

FIG. 2 is a diagram showing an example of the relationship among the individual certification authorities CA in the PKI system shown in FIG. 1.

As shown in the figure, it is premised in the PKI system of this embodiment that a plurality of security domains SD ($SD_1$–$SD_3$) on private and governmental bases are coexistent. Some of the security domains SD ($SD_2$ and $SD_3$ in FIG. 2) are assumed to be so related that their root certification authorities CA ($CA_{21}$ and $CA_{31}$ in FIG. 2) perform cross-certification by, for example, issuing public key certificates to each other. Besides, the root certification authorities CA of the respective security domains SD ($CA_{11}$, $CA_{21}$ and $CA_{31}$ in FIG. 2) are assumed to perform cross-certification between them and a bridge certification authority $CA_{bridge}$ by, for example, issuing public key certificates to the bridge certification authority $CA_{bridge}$ and also having public key certificates issued thereto by the bridge certification authority $CA_{bridge}$. In this way, a path can be formed between the certification authority CA belonging to a certain one of the security domains SD and the certification authority CA belonging to another in order that the validity of the public key certificate issued by one certification authority CA may be authenticated by the other certification authority CA.

Next, there will be explained the end entity EE, certification authority CA and certificate validity authentication center VC which constitute the PKI system described above.

First, the end entity EE will be explained.

Figure 3:
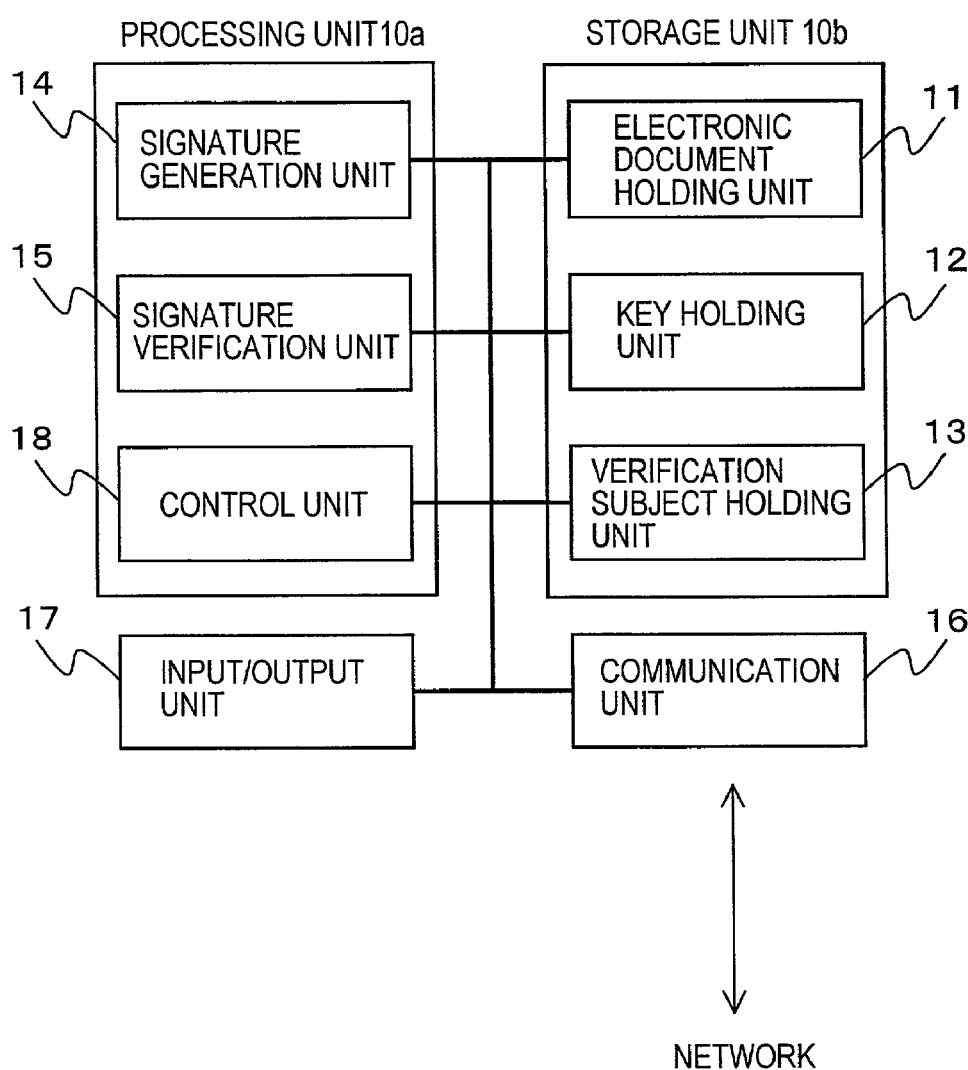
FIG. 3 is a block diagram showing the schematic construction of an end entity EE shown in FIG. 1.

FIG. 3 is a block diagram showing the schematic construction of the end entity EE.

As shown in the figure, the end entity EE includes a processing unit 10a, a storage unit 10b, a communication unit 16 which serves to communicate with another device through the network NET, and an input/output unit 17 which inputs/outputs electronic documents created by users or electronic documents received from other end entities EE or user terminals, and which accepts instructions given by the users.

The processing unit 10a includes a signature generation unit 14, a signature verification unit 15, and a control unit 18 which collectively controls the various units of the end entity EE.

The storage unit 10b includes an electronic document holding unit 11 which holds therein the electronic documents created by the users (received from the user terminals, in the case where the end entity EE is the accepting server), a key holding unit 12 which holds therein secret keys (signature keys) and public key certificates pairing with the respective secret keys, and a verification subject holding unit 13 which holds therein signed electronic documents and public key certificates received from other end entities EE.

In such a construction, when the control unit 18 has accepted from the user through the input/output unit 17 an instruction to the effect that an electronic document held in the electronic document holding unit 11 is to be transmitted to another end entity EE, it reads out the pertinent electronic document from the electronic document holding unit 11 and delivers this document to the signature generation unit 14. Then, the signature generation unit 14 generates a signature for the pertinent electronic document by using a secret key held in the key holding unit 12. Thereafter, the control unit 18 creates a signed electronic document by affixing the signature created by the signature generation unit 14, to the electronic document read out of the electronic document holding unit 11. Further, it attaches a public key certificate held in the key holding unit 12, to the signed electronic document created, whereupon it transmits them to the address of the end entity EE being a transmission destination indicated by the user, through the communication unit 16.

In addition, when the control unit 18 has received a signed electronic document and a public key certificate from another end entity EE through the communication unit 16, it causes the verification subject holding unit 13 to hold them and simultaneously notifies the holding operation to the signature verification unit 15. Then, the signature verification unit 15 verifies the signature of the signed electronic document held in the verification subject holding unit 13, by using the public key certificate received together with this electronic document. Here, only in a case where the verification has held good, the signed electronic document is dealt with as being legal, and it is outputted from the input/output unit 17 as may be needed.

However, in a case where, in spite of the signature verification having held good, the public key certificate used for this signature verification has been issued by any other terminal admitting certification authority CA than the terminal admitting certification authority CA which admits the end entity EE of its own (that is, which has issued the public key certificate to the end entity EE of its own), the signature verification unit 15 transmits a request for authenticating the validity of the public key certificate used for the signature verification, to the certificate validity authentication center VC. On this occasion, if necessary, trustworthiness (policy) indicating a level of certification and/or assurance for the certification authority is contained in the authentication request. Thus, only in a case where the validity of the pertinent public key certificate has been authenticated by the certificate validity authentication center VC, the signed electronic document is dealt with as being legal, and it is outputted from the input/output unit 17 as may be needed. Herein, the trustworthiness is indicated by the amount of business, or the like of the electronic procedure to be taken by the signed electronic document. Besides, the trustworthiness may be indicated, for example, by the confidentiality of a document to be dealt with or the trustworthiness of a singer of the singed electronic document (such as signer's reporting himself is necessary, or the processing via a network is acceptable)

Next, the certification authority CA will be explained.

Figure 4:
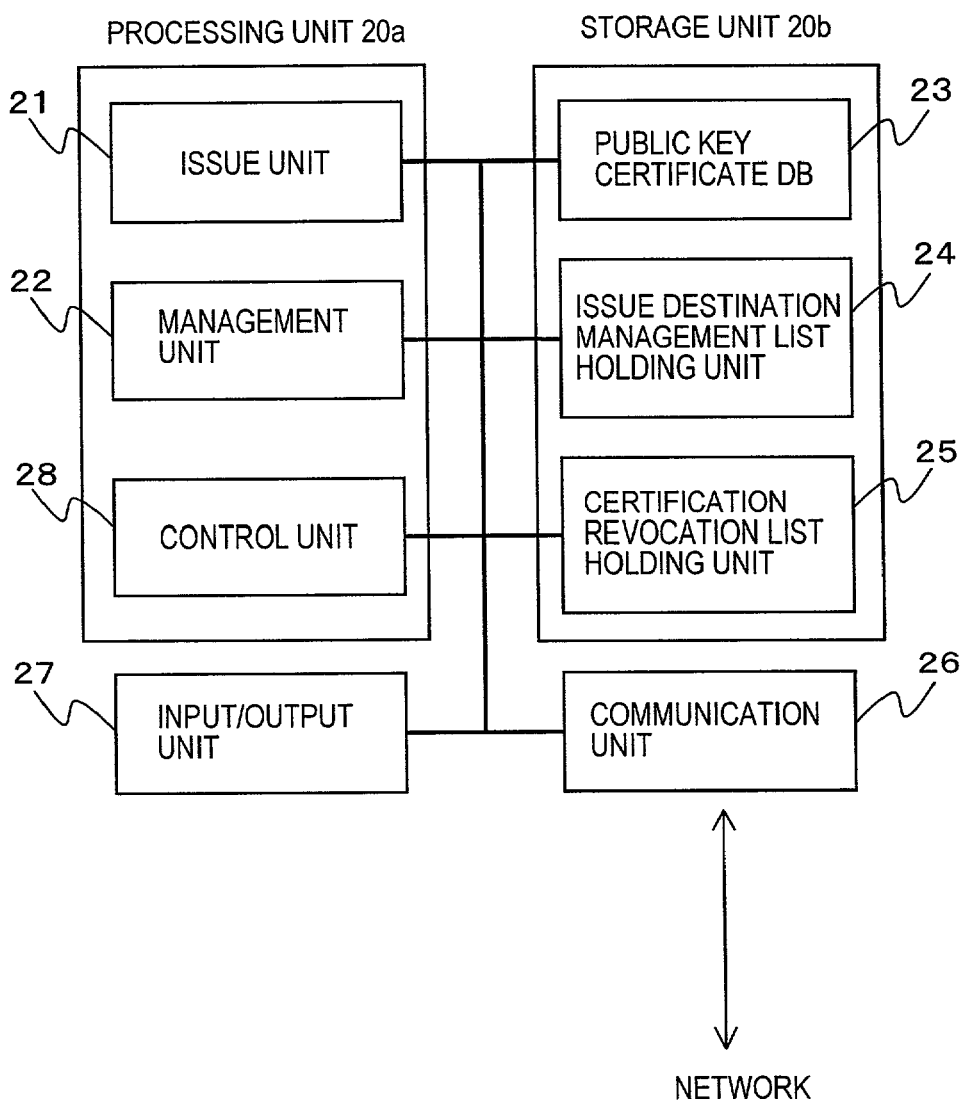
FIG. 4 is a block diagram showing the schematic construction of the certification authority CA shown in FIG. 1.

FIG. 4 is a block diagram showing the schematic construction of the certification authority CA.

As shown in the figure, the certification authority CA includes a processing unit 20a, a storage unit 20b, a communication unit 26 which serves to communicate with another device through the network NET, and an input/output unit 27 which inputs/outputs public key certificates etc. and which accepts instructions given by users.

The processing unit 20a includes an issue unit 21 which issues public key certificates, a management unit 22 which manages the public key certificates issued by the issue unit 21, and a control unit 28 which collectively controls the various units of the certification authority CA.

The storage unit 20b includes a public key certificate database 23 which holds therein the public key certificates issued by the issue unit 21, an issue destination management list holding unit 24 which holds therein an issue destination management list describing the issue destinations of the respective public key certificates held in the public key certificate database 23, and a certification revocation list holding unit 25.

In such a construction, when the control unit 28 has accepted a request for the issue of a public key certificate through the input/output unit 27 or the communication unit 26, it notifies the acceptance of the request to the issue unit 21. Then, the issue unit 21 creates a secret key (signature key) which a requester for the issue uses for the generation of a signature, and the public key certificate which pairs with the secret key. On this occasion, the issue unit 21 signs the public key certificate by using the secret key of its own certification authority CA. Besides, if necessary, the issue unit 21 describes in the public key certificate the validity term of this public key certificate, the names of other certification authorities which are not trusted (Name Constraints), the maximum path length which is allowed for the authentication of the validity of the pertinent public key certificate (the maximum allowable number of certification authorities on a path), and the trustworthiness (policy) of a signature based on the secret key pairing with the pertinent public key certificate as is expressed by the amount of business, or the like of the electronic procedure. Thereafter, the created public key certificate and secret key are delivered to the issue requester by mail or communication through the input/output unit 27 or the communication unit 26. Also, the pertinent public key certificate is registered in the public key certificate database 23, and the information of the issue destination (that is, the issue requester) is described in the issue destination management list held in the issue destination management list holding unit 24.

In addition, when the control unit 28 has accepted a request for the revocation of a public key certificate through the input/output unit 27 or the communication unit 26, it notifies the acceptance of the request to the management unit 22. Then, the management unit 22 deletes the public key certificate to-be-revoked from the public key certificate database 23 and simultaneously deletes the information of the issue destination of the pertinent public key certificate from the issue destination management list held in the issue destination management list holding unit 24. However, it is not essential to delete the public key certificate to-be-revoked from the public key certificate database 23. Further, the management unit 22 periodically creates a certification revocation list (abbreviated to "CRL", and also called "ARL" short for authority revocation list) in which information items about public key certificates to-be-revoked are described, and it causes the CRL holding unit 25 to hold the CRL. Incidentally, the management unit 22 shall describe the next date and hour scheduled to create the CRL, in the created CRL.

Yet in addition, when the control unit 28 has received a query about the information of the revocation of a public key certificate from another device through the communication unit 26, it searches the certification revocation list held in the CRL holding unit 25, to check whether or not the queried public key certificate has been revoked. Besides, the control unit 28 notifies the result of the check as a reply to the other device having queried, through the communication unit 26 (a communication protocol which is used for such a query and a reply is the OCSP short for "Online Certification Status Protocol").

Incidentally, the management unit 22 also executes a process for examining the validity terms of individual public key certificates stored in the public key certificate database 23, so as to delete any public key certificate whose validity term has expired, from the public key certificate database 23, and to delete the information of the issue destination of the pertinent public key certificate from the issue destination management list held in the issue destination management list holding unit 24.

Next, the certificate validity authentication center VC will be explained.

Figure 5:
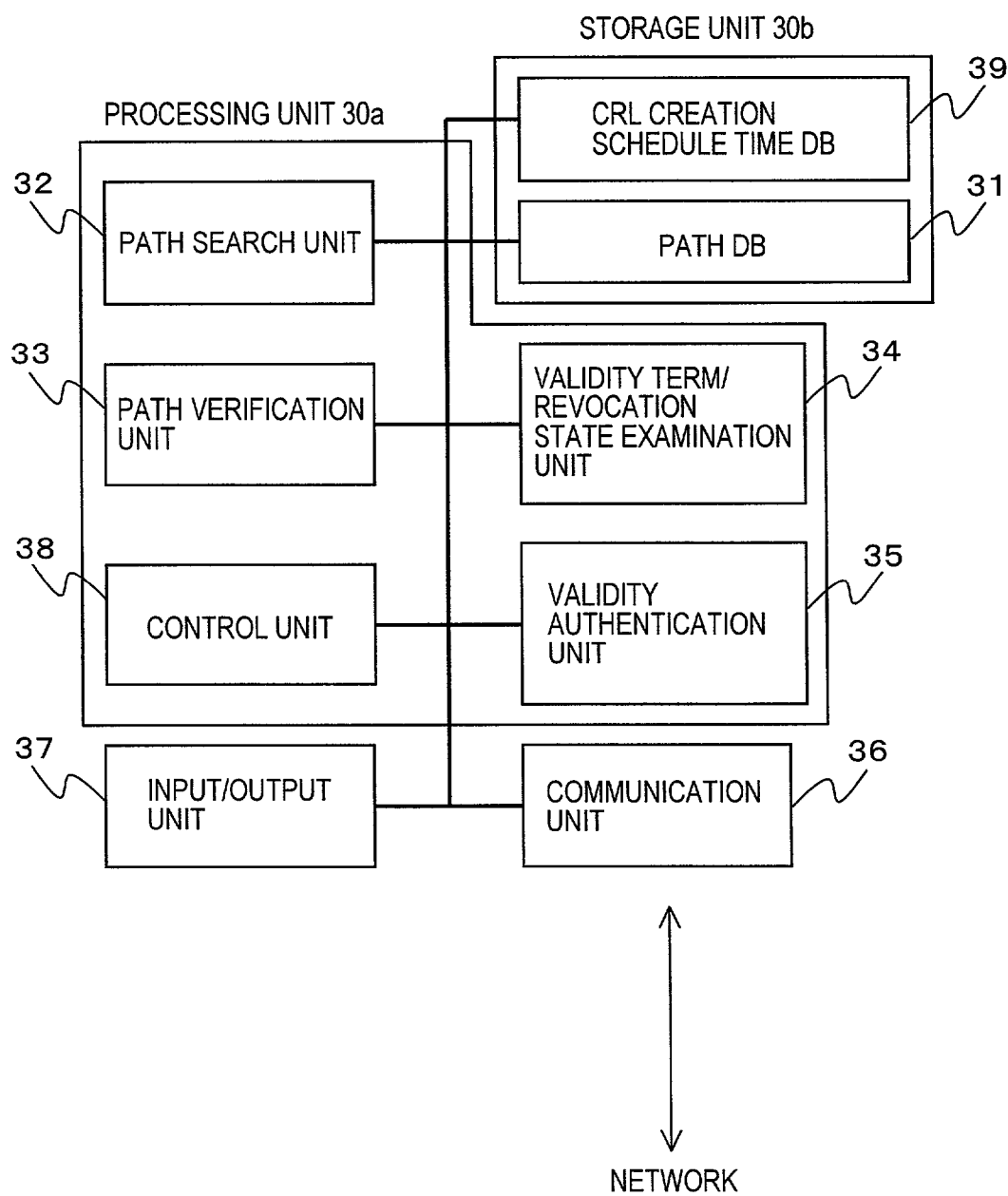
FIG. 5 is a block diagram showing the schematic construction of a certificate validity authentication center VC shown in FIG. 1.

FIG. 5 is a block diagram showing the schematic construction of the certificate validity authentication center VC.

As shown in the figure, the certificate validity authentication center VC includes a processing unit 30a, a storage unit 30b, a communication unit 36 which serves to communicate with another device through the network NET, and an input/output unit 37 which inputs/outputs public key certificates etc. and which accepts instructions given by users.

The processing unit 30a includes a path search unit 32, a path verification unit 33, a validity term/revocation state examination unit 34, a validity authentication unit 35, and a control unit 38 which collectively controls the various units of the certificate validity authentication center VC. On the other hand, the storage unit 30b includes a path database 31, and a certification revocation list (CRL) creation schedule time database 39.

The path search unit 31 periodically searches for paths which extend from the bridge certification authority $CA_{bridge}$ to the individual terminal admitting certification authorities CA having issued public key certificates to the end entities EE.

Each time a path has been searched for by the path search unit 31, the path verification unit 32 verifies the path detected by the path search unit 31. Besides, the path verification unit 32 registers the path whose verification has held good, in the path database 31. Herein, the path is registered in association with the name of the terminal admitting certification authority CA which is located at the downmost stream on the path relative to the upstream bridge certification authority $CA_{bridge}$, and with public key certificates obtained from the certification authorities CA on the path and issued from these certification authorities CA to the certification authorities CA which are respectively located directly downstream of them (to the end entities EE in a case where the certification authorities CA being issue origins are the terminal admitting certification authorities CA).

The validity term/revocation state examination unit 34 examines the validity terms and revocation states of the public key certificates as to each of the paths registered in the path database 31. These public key certificates are ones having been issued by the certification authorities CA on the path, to the certification authorities CA which are respectively located directly downstream of the issue-origin certification authorities CA on the path (to the end entities EE in the case where the issue-origin certification authorities CA are the terminal admitting certification authorities CA). Further, the unit 34 updates the path database 33 in accordance with the result of the examination.

In addition, the validity term/revocation state examination unit 34 registers the next CRL creation schedule times described in the CRLs (certification revocation lists) obtained from the CRL holding units 25 of the respective certification authorities CA, in the CRL creation schedule time database 39 in association with the pertinent certification authorities CA.

In compliance with a request made by the end entity EE, the validity authentication unit 35 authenticates the validity of a public key certificate issued by any terminal admitting certification authority CA which is other than the terminal admitting certification authority CA admitting the pertinent end entity EE, for the terminal admitting certification authority CA admitting this end entity EE.

Figure 6:
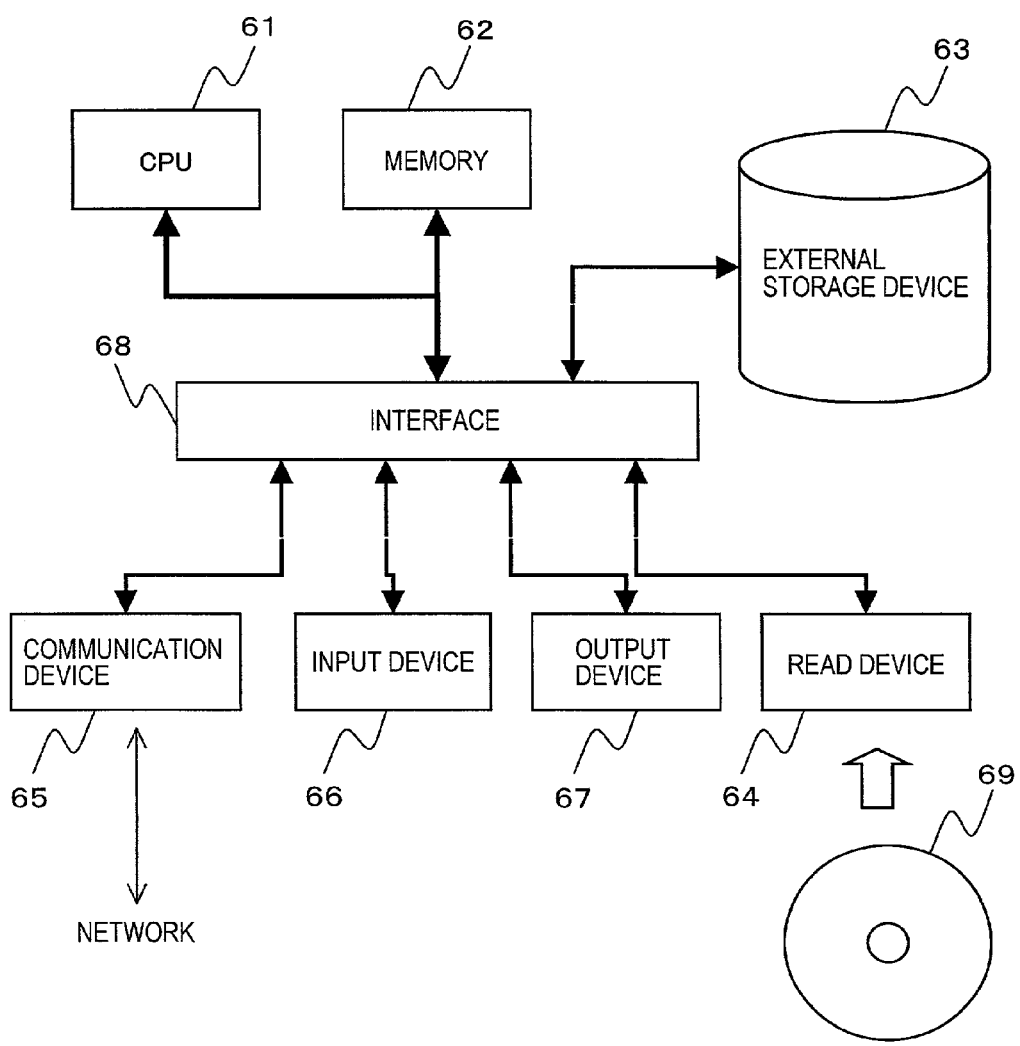
FIG. 6 is a block diagram showing an example of hardware construction of each of the end entity EE, certification authority CA and certificate validity authentication center VC which are respectively shown in FIGS. 3, 4 and 5.

Incidentally, the end entity EE, certification authority CA and certificate validity authentication center VC shown in FIGS. 3–5 can be respectively realized, for example, in such a way that a CPU 61 runs predetermined programs loaded in a memory 62 in a general electronic computer as shown in FIG. 6. More specifically, the electronic computer includes the CPU 61, the memory 62, an external storage device 63 such as hard disk, a read device 64 which reads information from a portable storage medium 69 such as CD-ROM, a communication device 65 which serves to communicate with another device through the network, an input device 66 such as keyboard or mouse, an output device 67 such as monitor or printer, and an interface 68 which exchanges data among the constituent devices. Thus, the communication units 16, 26 and 36 are realized in such a way that the CPU 61 utilizes the communication device 65; the input/output units 17, 27 and 37 are done in such a way that the CPU 61 utilizes the input device 66, output device 67 and read device 64; and the storage units 10b, 20b and 30b are done in such a way that the CPU 61 utilizes the memory 62 and external storage device 63. Besides, the processing units 10a, 20a and 30a are realized as processes on the CPU 61.

Such predetermined programs for realizing the end entity EE, certification authority CA and certificate validity authentication center VC on the electronic computer, respectively, may be read out of the storage medium 69 through the read device 64 or downloaded from another server via the network through the communication unit 65 so as to be loaded into the memory 62 after being once stored in the external storage device 63 or directly without being stored in the external storage device 63, whereupon they may be run by the CPU 61.

Next, the operation of the certificate validity authentication center VC of the above construction will be explained.

The operation of the certificate validity authentication center VC in this embodiment is divided into the operation of searching for, verifying and managing paths, and the operation of authenticating the validity of a public key certificate.

There will now be explained the operation of searching for, verifying and managing paths.

FIGS. 7 and 8 are flow charts for explaining the operation of searching for, verifying and managing paths as is executed in the certificate validity authentication center VC in this embodiment.

Referring to FIG. 7, when a predetermined time period (for example, one day) has lapsed (step S1001), the control unit 38 requests the path search unit 32 to search for paths. Then, the path search unit 32 searches for paths which extend from the bridge certification authority $CA_{bridge}$ to the individual terminal admitting certification authorities CA (step S1002).

Concretely, the path search unit 32 accesses the issue destination management list holding unit 24 of the bridge certification authority $CA_{bridge}$ so as to obtain the information items of the issue destinations of public key certificates issued by the bridge certification authority $CA_{bridge}$. Subsequently, in a case where the issue destinations obtained are the certification authorities CA, the path search unit 32 accesses the issue destination management list holding unit 24 of the certification authority CA of each of the issue destinations so as to further inspect the issue destinations of public key certificates issued by each certification authority CA. Such a process is continued until the issue destinations of public key certificates become the end entities EE, thereby to search for the paths which extend from the bridge certification authority $CA_{bridge}$ to the individual terminal admitting certification authorities CA. Here, in order to prevent the process from being iterated limitlessly due to the loop of the paths, in a case where the issue destinations obtained from the issue destination management list holding unit 24 of a certain certification authority CA include any certification authority CA which is located upstream of a partial path formed before, the process in which the certain certification authority CA is the issue destination shall not be executed.

The path search process at the step S1002 will be elucidated more concretely by taking as an example the case where the individual certification authorities CA are in the relationship shown in FIG. 2.

First, the path search unit 32 accesses the issue destination management list holding unit 24 of the bridge certification authority $CA_{bridge}$ so as to obtain the information items of the certification authorities $CA_{11}$, $CA_{21}$ and $CA_{31}$ as the information items of the issue destinations of public key certificates issued by the bridge certification authority $CA_{bridge}$.

Subsequently, the path search unit 32 executes the following process by noticing any of the issue destinations (certification authorities $CA_{11}$, $CA_{21}$ and $CA_{31}$) obtained from the bridge certification authority $CA_{bridge}$.

If the noticed issue destination is the certification authority CA (hereinbelow, called "noticed certification authority CA"), the path search unit 32 sets a partial path with the bridge certification authority $CA_{bridge}$ located upstream, along the bridge certification authority $CA_{bridge}$—the noticed certification authority CA. Subsequently, the path search unit 32 accesses the issue destination management list holding unit 24 of the noticed certification authority CA so as to further obtain the information items of the issue destinations of public key certificates issued by this noticed certification authority CA. It is assumed here that the noticed issue destination is the certification authority $CA_{11}$, so the partial path is set along the bridge certification authority $CA_{bridge}$—the certification authority $CA_{11}$, and that the information items of the certification authorities $CA_{bridge}$, $CA_{12}$ and $CA_{13}$ are obtained as the information items of the issue destinations from the certification authority $CA_{11}$.

Subsequently, the path search unit 32 checks whether or not any certification authority CA on the partial path (hereinbelow, called "loop certification authority CA") is included among the issue destinations ($CA_{bridge}$, $CA_{12}$ and $CA_{13}$) obtained from the certification authority $CA_{11}$. In a case where any issue destination (certification authority CA) is included, it is excluded from subjects to-be-handled. Accordingly, the certification authority $CA_{bridge}$ is excluded from the subjects to-be-handled here. Subsequently, the path search unit 32 checks whether or not any end entity EE is included among the issue destinations obtained from the certification authority $CA_{11}$. In a case where the end entity EE is included, the certification authority $CA_{11}$ becomes the terminal admitting certification authority. Here, however, the end entity EE is not included among the issue destinations obtained from the certification authority $CA_{11}$. Accordingly, the path search unit 32 notices either of the issue destinations except the loop certification authority CA as obtained from the certification authority $CA_{11}$ (that is, the certification authorities $CA_{12}$ and $CA_{13}$), in order to stretch up to the terminal admitting certification authority CA the partial path which has been set along the bridge certification authority $CA_{bridge}$—the certification authority $CA_{11}$.

If the noticed issue destination is any certification authority CA, the path search unit 32 sets a partial path connecting this noticed certification authority CA, downstream of the partial path set before. Subsequently, the path search unit 32 accesses the issue destination management list holding unit 24 of the noticed certification authority CA so as to further obtain the information items of the issue destinations of public key certificates issued by the pertinent noticed certification authority CA. It is assumed here that the noticed issue destination (certification authority CA) is the certification authority $CA_{12}$, so the partial path is set along the bridge certification authority $CA_{bridge}$—the certification authority $CA_{11}$—certification authority $CA_{12}$, and that the end entities $EE_1$ and $EE_2$ are obtained as the information items of the issue destinations from the certification authority $CA_{12}$.

Subsequently, the path search unit 32 checks whether or not any loop certification authority CA is included among the issue destinations ($EE_1$ and $EE_2$) obtained from the certification authority $CA_{12}$. In a case where any issue destination (loop certification authority CA) is included, it is excluded from subjects to-be-handled. Since any loop certification authority CA is not included here, the path search unit 32 shifts to the next process and checks whether or not any end entity EE is included among the issue destinations obtained from the terminal admitting certification authority $CA_{12}$. Here, all the obtained issue destinations are the end entities EE, so that the certification authority $CA_{12}$ is the terminal admitting certification authority. Therefore, the path search unit 32 detects the partial path on which the certification authority $CA_{12}$ is located at the downmost stream, as the path which extends from the bridge certification authority $CA_{bridge}$ to the terminal admitting certification authority $CA_{12}$ ($CA_{bridge}$—$CA_{11}$—$CA_{12}$).

Subsequently, the path search unit 32 checks whether or not any issue destination (certification authority CA other than the loop certification authority CA) which is not noticed yet is existent among the information items of the issue destinations obtained from the certification authority $CA_{12}$ which is located at the downmost stream on the detected path. In the existence of such an issue destination, the unit 32 continues the above process with this issue destination as the noticed certification authority CA. On the other hand, in the nonexistence of such an issue destination, the unit 32 checks whether or not any issue destination (certification authority CA other than the loop certification authority CA) which is not noticed yet is existent among the information items of the issue destinations obtained from the certification authority $CA_{11}$ which is located directly upstream. Further, in the existence of such an issue destination, the unit 32 continues the above process with this issue destination as the noticed certification authority CA. Here, the certification authority $CA_{13}$ is not noticed yet among the information items of the issue destinations obtained from the certification authority $CA_{11}$, so that the unit 32 executes the above process with the certification authority $CA_{13}$ as the noticed certification authority CA, thereby to detect the path which extends from the bridge certification authority $CA_{bridge}$ to the terminal admitting certification authority $CA_{13}$ ($CA_{bridge}$—$CA_{11}$—$CA_{13}$).

In this manner, the path search unit 32 continues the above process as to each of all the certification authorities CA located on the detected path, until any issue destination (certification authority CA other than the loop certification authority CA) not noticed yet becomes nonexistent among the information items of the issue destinations obtained from the pertinent certification authority CA. Thus, the unit 32 detects the paths which extend from the bridge certification authority $CA_{bridge}$ to the respective terminal admitting certification authorities CA. As a result, in the case where the individual certification authorities CA are in the relationship shown in FIG. 2, those paths from the bridge certification authority $CA_{bridge}$ to the respective terminal admitting certification authorities CA which are detected by the path search unit 32 become as shown in FIG. 9.

Meanwhile, when the paths extending from the bridge certification authority $CA_{bridge}$ to the respective terminal admitting certification authorities CA have been detected by the path search unit 32, the control unit 38 of the certificate validity authentication center VC requests the path verification unit 33 to verify the paths. Then, the path verification unit 33 verifies the paths detected by the path search unit 32 (step S1003).

Concretely, the path verification unit 33 executes the following process as to each of the paths detected by the path search unit 32.

First, the path verification unit 33 accesses the public key certificate databases 23 of the individual certification authorities CA on each path so as to obtain public key certificates which these certification authorities CA have issued to the certification authorities CA to the certification authorities CA respectively located directly downstream on the pertinent path (to the end entities EE in a case where the access-destination certification authorities CA are the terminal admitting certification authorities CA).

Subsequently, the path verification unit 33 verifies the signature of the public key certificate issued by the terminal admitting certification authority CA located at the downmost stream on the path, in the light of the public key certificate issued by the certification authority CA located directly upstream. In a case where the verification has held good, the unit 33 verifies the signature of the public key certificate issued by the pertinent certification authority CA located directly upstream, in the light of the public key certificate issued by the certification authority CA located directly upstream still further. Such a process is continued until the pertinent certification authority CA located directly upstream becomes the bridge certification authority $CA_{bridge}$, thereby to tentatively verify the pertinent path.

By way of example, in case of tentatively verifying the path which extends from the bridge certification authority $CA_{bridge}$ to the terminal admitting certification authority $CA_{13}$ ($CA_{bridge}$—$CA_{11}$–$CA_{13}$) in FIG. 2, the signature of the public key certificate issued by the terminal admitting certification authority $CA_{13}$ is first verified using the public key certificate which the root certification authority $CA_{11}$ being the certification authority CA located directly upstream of the terminal admitting certification authority $CA_{13}$ has issued to this terminal admitting certification authority $CA_{13}$. Subsequently, in a case where the verification has held good, the signature of the public key certificate issued by the root certification authority $CA_{11}$ is verified using the public key certificate which the bridge certification authority $CA_{bridge}$ being the certification authority CA located directly upstream of the root certification authority $CA_{11}$ has issued to this root certification authority $CA_{11}$. Besides, in a case where the verification has held good, the tentative verification of the path which extends from the bridge certification authority $CA_{bridge}$ to the terminal admitting certification authority $CA_{13}$ shall have held good.

Next, when the tentative verification of the path has held good, the path verification unit 33 checks whether or not the description of a constraint, such as the names of other certification authorities which are not trusted (Name Constraints) or the maximum path length which is allowed for the authentication of the validity of any public key certificate (the maximum allowable number of certification authorities on the path), is existent in the public key certificates obtained from the respective certification authorities CA on the pertinent path. In the existence of such a description, the unit 33 checks whether or not the pertinent path observes the constraint, and it decides that the verification of the pertinent path has held good, only when the constraint is observed.

By way of example, in a case where the tentative verification of a path extending from the bridge certification authority $CA_{bridge}$ to a terminal admitting certification authority $CA_{26}$ ($CA_{bridge}$—$CA_{31}$–$CA_{21}$–$CA_{22}$–$CA_{25}$–$CA_{26}$) in FIG. 2 has held good, the verification of the path shall not have held good when the certification authority $CA_{31}$ is described as the name of another certification authority not trusted, in a public key certificate obtained from the certification authority $CA_{26}$. Also, in the above case, the verification of the path shall not have held good when the number of certification authorities=5 is described as a path length in the public key certificate obtained from the certification authority $CA_{26}$.

When the respective paths detected by the path search unit 32 have been verified by the path verification unit 33 as stated above, the control unit 38 once clears the registered contents of the path database 31 and thereafter registers the respective paths whose verifications have held good in the path verification unit 33, in the path database 31 in association with the terminal admitting certification authorities CA located at the downmost streams on the corresponding paths and with the public key certificates obtained from the certification authorities CA located on these paths (step S1004).

On the other hand, the validity term/revocation state examination unit 34 checks whether or not any public key certificate whose validity term has expired is existent among the public key certificates registered in the path database 31 (step S1005). In the existence of the validity term-expired public key certificate, the public key certificate database 23 of the issue-origin certification authority CA of the pertinent public key certificate is accessed so as to search for a public key certificate which has been issued to the issue destination of the pertinent public key certificate anew (step S1006).

Besides, if such a new public key certificate is not existent in the public key certificate database 23 of the issue-origin certification authority CA, information about the path registered in association with the validity term-expired public key certificate is deleted from the path database 31 (step S1007). On the other hand, if such a new public key certificate is existent in the public key certificate database 23 of the issue-origin certification authority CA, it is obtained. Further, the verification of the path registered in the path database 31 in association with the validity term-expired public key certificate is executed in accordance with the same purport as at the step S1003 by using the public key certificate which has been obtained anew instead of the validity term-expired public key certificate (step S1008).

Incidentally, the path verification at the step S1008 may well be replaced with an expedient in which the signature of the public key certificate obtained anew is verified in the light of a public key certificate issued by the certification authority CA located directly upstream of the issue-origin certification authority CA of this public key certificate on the pertinent path, and in which the verification of the pertinent path is regarded as having held good when the verification of the signature has held good.

Referring to FIG. 8, in a case where the verification of the path has held good ("Yes" at a step S1009), the validity term-expired public key certificate registered in the path database 31 in association with the pertinent path is substituted by the public key certificate obtained anew (step S1010). On the other hand, in a case where the verification of the path has not held good ("No" at the step S1009), the path registered in association with the validity term-expired public key certificate is deleted from the path database 31 (step S1011).

Subsequently, the validity term/revocation state examination unit 34 examines the certification revocation list (CRL) creation schedule time database 39 so as to search for any certification authority CA associated with a CRL creation schedule time which has already lapsed (step S1012). In the existence of such a certification authority CA ("Yes" at a step S1013), the CRL holding unit 25 of the pertinent certification authority CA is accessed so as to obtain the newest CRL issued by this certification authority CA (step S1014). Besides, the CRL creation schedule time registered in association with the pertinent certification authority CA is updated to a CRL creation schedule time described in the newest CRL obtained, in the CRL creation schedule time database 39 (step S1015).

Thereafter, the validity term/revocation state examination unit 34 checks whether or not any public key certificate described in the newest CRL obtained is registered in the path database 31 (step S1016). In a case where the public key certificate is registered, information about any path associated with this public key certificate is deleted from the path database 31 (step S1017).

There will now be explained the operation of authenticating the validity of a public key certificate.

Figure 11:
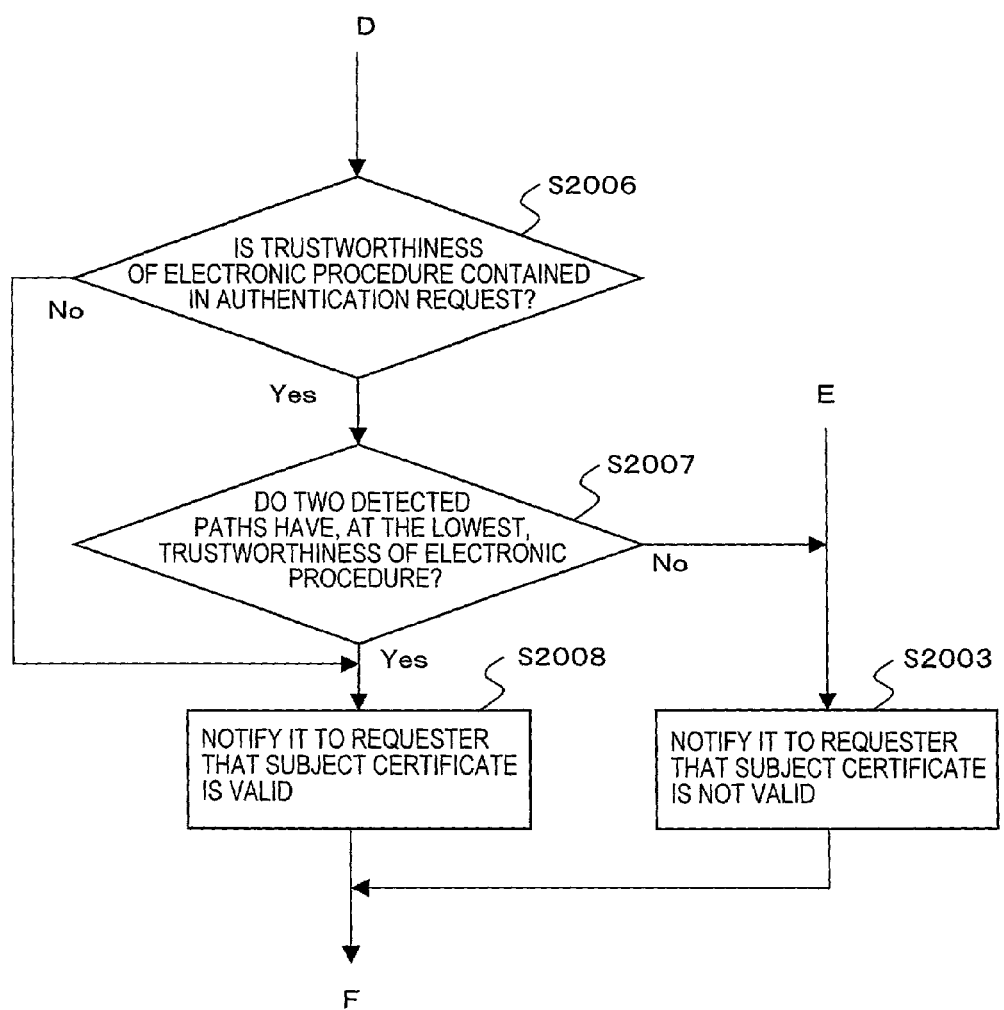
FIG. 11 is a flow chart for explaining the operation of authenticating the validity of the public key certificate as is executed in the certificate validity authentication center VC shown in FIG. 5.

FIGS. 10 and 11 are flow charts for explaining the operation of authenticating the validity of a public key certificate as is executed in the certificate validity authentication center VC in this embodiment.

Referring to these figures, when the control unit 38 has received a request for the authentication of the validity of a public key certificate, which contains a name of a terminal admitting certification authority CA admitting a certain end entity EE and which has been issued by any terminal admitting certification authority CA other than the above terminal admitting certification authority CA, from the end entity EE through the communication unit 36 (step S2001), it notifies the reception of the request to the validity authentication unit 35. Incidentally, when the name of the terminal admitting certification authority CA is not contained in the authentication request for the validity of the public key certificate, a default certification authority CA preset in the certificate validity authentication center VC is set as a terminal admitting certification authority CA admitting the end entity EE. Then, if the terminal admitting authority CA having issued the public key certificate whose validity is to be authenticated, is other than the above set terminal admitting certification authority CA, the validity authentication unit 35 is notified as such.

Then, the validity authentication unit 35 checks whether or not a path associated with the terminal admitting certification authority CA having issued the public key certificate as is specified from the description of the pertinent certificate being a subject for the request, and a path associated with the terminal admitting certification authority CA which admits the end entity EE being a requester, are registered in the path database 31 (step S2002).

If, as a result, it has been found that both the path associated with the terminal admitting certification authority CA which has issued the subject public key certificate, and the path associated with the terminal admitting certification authority CA which admits the requester end entity EE, are not registered in the path database 31, the validity authentication unit 35 notifies it to the requester end entity EE through the communication unit 36 that the subject public key certificate is not valid (step S2003).

On the other hand, if it has been successfully authenticated that both the path associated with the terminal admitting certification authority CA which has issued the subject public key certificate, and the path associated with the terminal admitting certification authority CA which admits the requester end entity EE, are registered in the path database 31, the validity authentication unit 35 further checks whether or not the description of a constraint, such as the names of other certification authorities which are not trusted (Name Constraints) or the maximum path length which is allowed for the authentication of the validity of any public key certificate (the maximum allowable number of certification authorities on the path), is existent in the public key certificates registered in the path database 31 in association with either of the two paths (step S2004).

In the nonexistence of the description of such a constraint, the validity authentication unit 35 shifts to a step S2006. On the other hand, in the existence of the description of such a constraint, the validity authentication unit 35 shifts to a step S2005, and it checks whether or not the two paths observe the constraint, in other words, whether or not it is described in the public key certificates that any certification authority on the two paths is not trusted, or whether or not the number of certification authorities smaller than the number of certification authorities located on each of the two paths is described as the maximum path length.

Here, in the existence of such a description, the validity authentication unit 35 judges the two paths as failing to observe the constraint and notifies it to the requester end entity EE through the communication unit 36 that the public key certificate is not valid (step S2003). On the other hand, in the nonexistence of such a description, the validity authentication unit 35 judges the two paths as observing the constraint, and it shifts to the step S2006.

At the step S2006, the validity authentication unit 35 checks whether or not trustworthiness (policy) which is indicated by the amount of business, or the like of the electronic procedure to be taken by the end entity EE is contained in the authentication request received from the pertinent end entity EE. In a case where the trustworthiness of the electronic procedure is contained, the unit 35 further checks whether or not the description of trustworthiness which does not satisfy the above trustworthiness of the above electronic procedure is existent in the public key certificates which are registered in the path database 31 in association with either of the two paths (step S2007).

Here, in the existence of such a description, the validity authentication unit 35 judges the two paths as failing to be utilized for the authentication of the validity of the public key certificate for the electronic procedure to be taken by the requester end entity EE, and this unit notifies it to the requester end entity EE through the communication unit 36 that the public key certificate is not valid (step S2003).

On the other hand, in a case where the trustworthiness of the electronic procedure to be taken by the end entity EE is not contained in the authentication request received from the pertinent end entity EE, or in a case where the trustworthiness of the electronic procedure is contained, but where trustworthiness described in the public key certificates which are registered in the path database 31 in association with either of the two paths is equal to or higher than that of the electronic procedure, the validity authentication unit 35 judges the public key certificate as being valid and notifies it to the requester end entity EE through the communication unit 36 that the public key certificate is valid (step S2008).

Thus far, one embodiment of the present invention has been described.

In this embodiment, paths which extend from the bridge certification authority $CA_{bridge}$ to the respective terminal admitting certification authorities CA are periodically searched for and verified independently of the request of any end entity EE for authenticating the validity of a public key certificate. Besides, in a case where the request for authenticating the validity of a public key certificate has been received from a certain end entity EE, whether or not the public key certificate is valid is judged by checking with the paths searched for and verified beforehand whether or not a path through the bridge certification authority $CA_{bridge}$ can be established between the terminal admitting certification authority CA which admits the pertinent end entity EE and the terminal admitting certification authority CA which has issued the public key certificate being a subject for the request. It is accordingly possible to shorten a time period which is expended since the reception of the request for the authentication of the validity of the public key certificate till the authentication of the validity.

Besides, in this embodiment, in a case where the request for authenticating the validity of a public key certificate has been received from a certain end entity EE, whether or not a path through the bridge certification authority $CA_{bridge}$ can be established between the terminal admitting certification authority CA which admits the pertinent end entity EE and the terminal admitting certification authority CA which has issued the public key certificate being a subject for the request is checked with the paths searched for and verified beforehand, and subject to the establishment of the path, whether or not the subject public key certificate is valid is finally judged in consideration of a constraint (such as the names of other certification authorities which are not trusted (Name Constraints), the maximum path length (the maximum allowable number of certification authorities on the path), or trustworthiness (policy)) which is described in any public key certificate issued by any certification authority on the path. It is accordingly possible to more precisely judge the validity of the subject public key certificate.

Incidentally, the present invention is not restricted to the foregoing embodiment, but it can have various modifications within the scope of the purport thereof.

By way of example, in the foregoing embodiment, the certificate validity authentication center VC sets the bridge certification authority $CA_{bridge}$ as a start certification authority, and it searches for and verifies paths which extend from the bridge certification authority $CA_{bridge}$ to the individual terminal admitting certification authorities CA. The present invention, however, is not restricted to such an aspect. Any other certification authority CA can also be set as a start certification authority so as to search for and verify paths extending therefrom to the individual terminal admitting certification authorities CA. As a concrete example, in the case where the certification authorities CA are in the relationship shown in FIG. 2, any of the root certification authorities $CA_{11}$, $CA_{21}$ and $CA_{31}$ of the respective security domains SD may well be set as a start certification authority so as to search for and verify paths extending therefrom to the individual terminal admitting certification authorities CA.

Besides, in the foregoing embodiment, it is assumed for the brevity of description that, as shown in FIG. 2, the terminal admitting certification authorities CA issue public key certificates to the end entities EE only, while the other certification authorities CA issue public key certificates to the certification authorities CA only. As a matter of course, however, the present invention is similarly applicable also to a case where a PKI system includes a certification authority CA which issues public key certificates to both the end entity EE and the certification authority CA.

Further, in the foregoing embodiment, as the construction of the certification authority CA, it is explained that the cross-certification is performed among the root certification authorities of the individual security domains. It is not limited to the root certification authorities, but other certification authorities may perform the cross-certification.

As described above, according to the present invention, it is permitted to shorten a time period which is expended since a request for the authentication of the validity of a public key certificate till the authentication of the validity.

What is claimed is:

1. A certificate validity authentication method for a public key certificate wherein validity of the public key certificate is authenticated by a computer, wherein the computer executes:
a path search step of searching a path between any one of a plurality of certification authorities as a start point (a start certification authority) and at least one terminal certification authority which issues the public key certificate to terminals;
a path verification step of verifying the path searched by the path searching step;
a path registration step of registering the path verified by the path verification step in a database; and
a validity authentication step of receiving a request to authenticate the public key certificate and validating the public key certificate issued by the terminal certification authorities by using information on the verified path registered in the database, and wherein
the in the path search step, the computer executes:
a first step of setting the start certification authority as an issue origin certification authority;
a second step of obtaining issue destinations of all the public key certificates issued by a device of the issue origin certification authority;
a third step, as to each of the issue destinations obtained in the second step, in a case where the issue destination concerned is one of the plurality of certification authorities, setting a path between the issue destination concerned and the issue origin certification authority, and in a case where the issue destination concerned is one of the terminals, setting the issue origin certification authority as the terminal certification authority, and setting a path comprising at least one of the path thus set, between the start certification authority and the terminal certification authority as the searched path; and
a fourth step, if the issue destinations obtained in the second step include one of the plurality of certification authorities, returning to the second step, and wherein
in the path verification step, the computer executes:
a fifth step of setting the terminal certification authority as the issue destination certification authority;
a sixth step of verifying the signature of the public key certificate issued by the issue destination certification authority with another public key certificate issued by the issue origin certification authority located on the searched path; and
a seventh step, in a case where the signature has been verified and the issue origin certification authority on the searched path is not the start certification authority, setting the issue origin certification authority as a new issue destination certification authority on the searched path and returning to the sixth step, in a case where the signature has been verified and the issue origin certification authority on the searched path is the start certification authority, setting the searched path as a certification path (verified path).

2. A certificate validity authentication method for a public key certificate according to claim 1, wherein
in the validity authentication step, the computer judges that the public key certificate issued by the terminal certification authority is validated if the path between the start certification authority and a certification authority trusted by the authentication request originator and the path between the start certification authority and the terminal certification authority are both contained in the paths registered in the database.

3. Certificate validity authentication method for a public key certificate according to claim 2, wherein
in the validity authentication step, the computer judges that the public key certificate issued by the terminal certification authority is validated if the certification authority trusted by the authentication request originator is the start certification authority, and the path between the start certification authority and the terminal certification authority is registered in the database.

4. A certificate validity authentication method for a public key certificate according to claim 1, wherein in the third step, as to each of the issue destinations obtained in the second step, the computer does not set the certification authority as an issue destination certification authority, if the issue destination concerned is the certification authority concerned and the certification authority concerned is included in the paths already set.

5. A certificate validity authentication method for a public key certificate according to claim 1, wherein the computer executes the path search step independently of the validity authentication step, and executes the path verification step with respect to the path which has been searched and by the path search step, and wherein in the path registration step, the computer further executes an updating step of updating the registered contents of the database by the path verified by the path verification step.

6. A certificate validity authentication method for a public key certificate according to claim 1, wherein the computer further executes:

a validity term examination step of examining validity term of each of the public key certificates issued by the certificate authorities on each path registered in the database in the registration step;

an obtaining step of attempting to obtain, from the device of the issue origin certification authority of the public key certificate whose validity term has been confirmed to be time-expired in the validity term examination step, a new public key certificate for an issue destination of the public key certificate concerned; and a path re-verification step of verifying a signature of the newly obtained public key certificate with the public key certificate issued by the device of the certification authority which is the issue destination certification authority of the issue origin certification authority on the path, and wherein the computer deletes in the path registering step, the path including the public key certificate whose validity term has been confirmed to be time-expired, in either of the case where the validity of the signature of the new public key certificate has not been verified in the path re-verification step or a new public key certification has failed to be obtained in the obtaining step.

7. A certificate validity authentication method for a public key certificate according to claim 1, wherein the computer further executes an expiration information examination step of examining expiration information of the public key certificate issued by each certification authority on each of the paths registered in the database in the path registering step, and wherein the path registration step deletes the path including public key certificate whose validity has been confirmed to be time-expired based on the expiration information obtained in the expiration information examination step.

8. A certificate validity authentication method for a public key certificate according to claim 1, wherein the computer further executes an expiration information examination step of authenticating the public key certificate with the expiration information in the sixth step.

9. A certificate validity authentication method for a public key certificate according to claim 8, wherein in the expiration information examination step, as to each path registered in the database by the registration step, the computer executes:

an expiration information creation schedule time checking step of checking whether the scheduled time for creating the expiration information for the public key certificate has passed or not for each expiration information of the public key certificate issued by each certification authority;

an obtaining step of obtaining new expiration information on the expiration information whose scheduled time has been confirmed to have passed by the expiration information creation schedule time examination step; and a term-expired certificate examination step of examining whether the public key certificate given in the newly obtained expiration information is registered in the database or not, wherein in the path registration step, the computer deletes the path including the term-expired public key certificate which has been confirmed to be time-expired by the term-expired certificate expiration examination step.

10. A certificate validity authentication method for a public key certificate according to claim 1, wherein in the validity authentication step, the computer judges that the validity of the public key certificate has not been validated, if one of the public key certificates issued by any of the certificate authorities on the path includes a description that the certification authority and a validity authentication request originator is registered in the database.

11. A certificate validity authentication method for a public key certificate according to claim 1, wherein in the validity authentication step, the computer judges that the public key certificate has not been validated, if a largest possible number of certificate authorities on the path which is written in the public key certificate for the issue destination certification authority on the path issued by any of the certificate authorities on the path, exceeds the total number of the certificate authorities on the path, even when the path between the start certification authority and the validity authentication request originator is registered in the database.

12. A certificate validity authentication method for a public key certificate according to claim 1, wherein in the validity authentication step, when the validity authentication request for the public key certificate is accompanied by an indication of reliability degree required for taking electronic procedure, the computer judges that the public key certificate has not been validated, if the reliability degree which is written in the public key certificate for the issue destination certification authority on the path issued by any of the certificate authorities on the path is lower than the reliability required for the electronic procedure, even when the path between the path start certification authority and the validity authentication request originator is registered in the database.

13. A certificate validity authentication method for a public key certificate according to claim 1, wherein the start certification authority is a bridge certification authority which has cross-certify with each of root certification authorities of at least two security domains.

* * * * *